(12) United States Patent
Weisberger et al.

(10) Patent No.: US 6,729,007 B2
(45) Date of Patent: May 4, 2004

(54) METHOD FOR RELEASABLY LOCKING A STEERING COLUMN

(75) Inventors: Thomas W. Weisberger, Saginaw, MI (US); Bryan K. Avis, Westland, MI (US); James J. Jirik, Birch Run, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 110 days.

(21) Appl. No.: 10/353,712

(22) Filed: Jan. 29, 2003

(65) Prior Publication Data

US 2003/0118398 A1 Jun. 26, 2003

(Under 37 CFR 1.47)

Related U.S. Application Data

(62) Division of application No. 09/770,962, filed on Jan. 26, 2001, now Pat. No. 6,540,429.

(51) Int. Cl.[7] .............................. B23P 11/00; B62D 1/18
(52) U.S. Cl. ........................ 29/434; 29/455.1; 74/493
(58) Field of Search ........................ 29/434, 436, 450, 29/455.1; 74/493

(56) References Cited

U.S. PATENT DOCUMENTS

| 4,481,838 | A | * | 11/1984 | Findley et al. ................ 74/493 |
| 4,516,440 | A | * | 5/1985 | Nishikawa .................... 74/493 |
| 4,539,861 | A | * | 9/1985 | Nishikawa .................... 74/493 |
| 4,541,299 | A | * | 9/1985 | Kanaya et al. ................ 74/493 |
| 4,572,023 | A | * | 2/1986 | Euler ........................... 74/493 |
| 5,267,480 | A | * | 12/1993 | Krizan ......................... 74/493 |
| 5,588,337 | A | | 12/1996 | Milton ......................... 74/552 |
| 6,237,439 | B1 | | 5/2001 | Weber et al. ................. 74/493 |
| 6,324,935 | B1 | | 12/2001 | Schoen et al. ................ 74/493 |
| 2002/0121014 | A1 | * | 9/2002 | Barton et al. ................ 29/434 |

* cited by examiner

Primary Examiner—David P. Bryant
(74) Attorney, Agent, or Firm—Brinks Hofer Gilson & Lione

(57) ABSTRACT

A steering column locking mechanism. A stationary tube is provided with a movable tube telescopically positioned over it. A plurality of teeth is provided on the outer surface of the movable tube that mesh with teeth defined on the outer diameter of a ring-shaped gear. The ring-shaped gear has an axial opening defined therein and first and second camming pins capable of being arranged in both an unlocked and a locked position are placed within the opening of the gear.

9 Claims, 7 Drawing Sheets

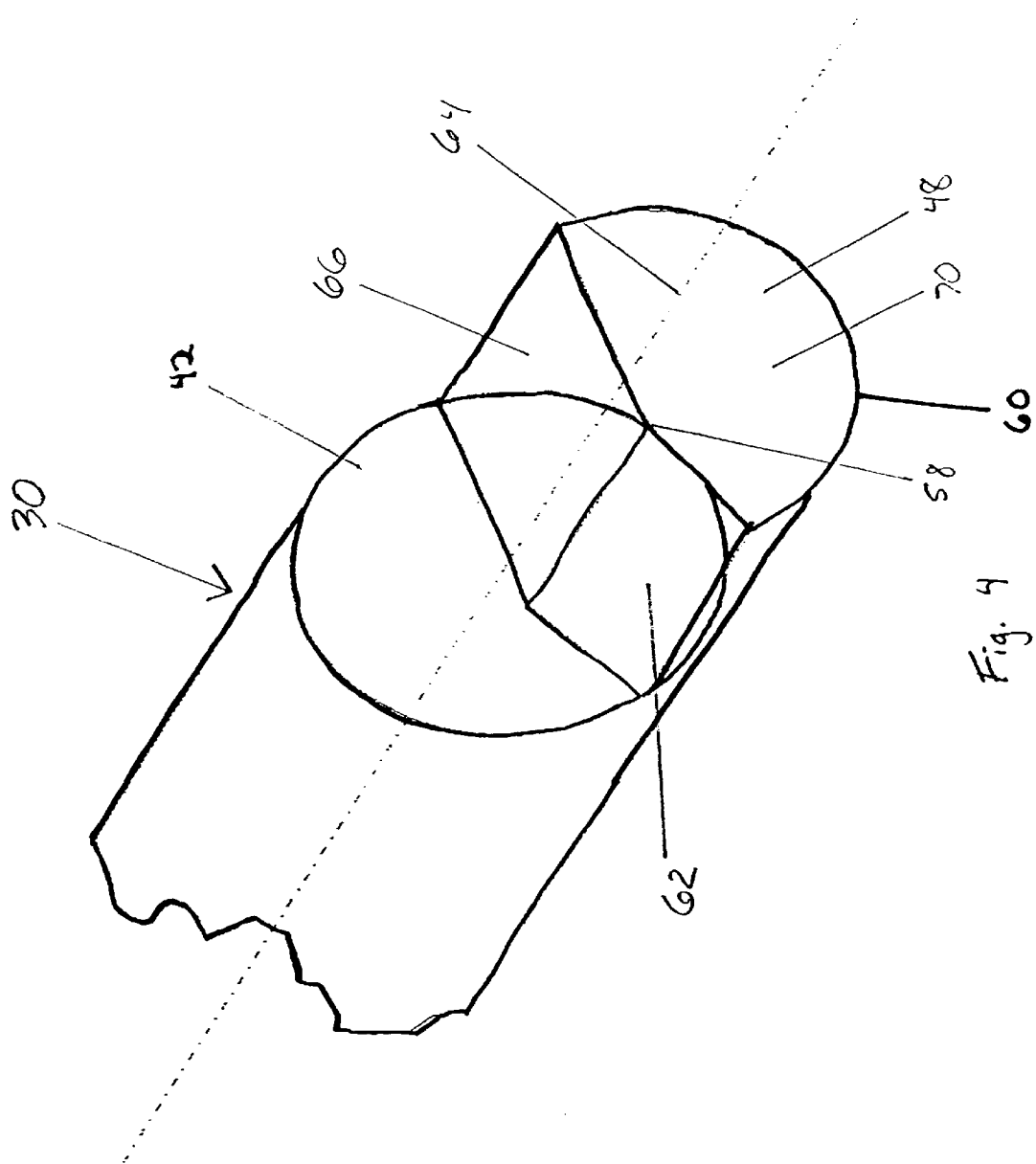

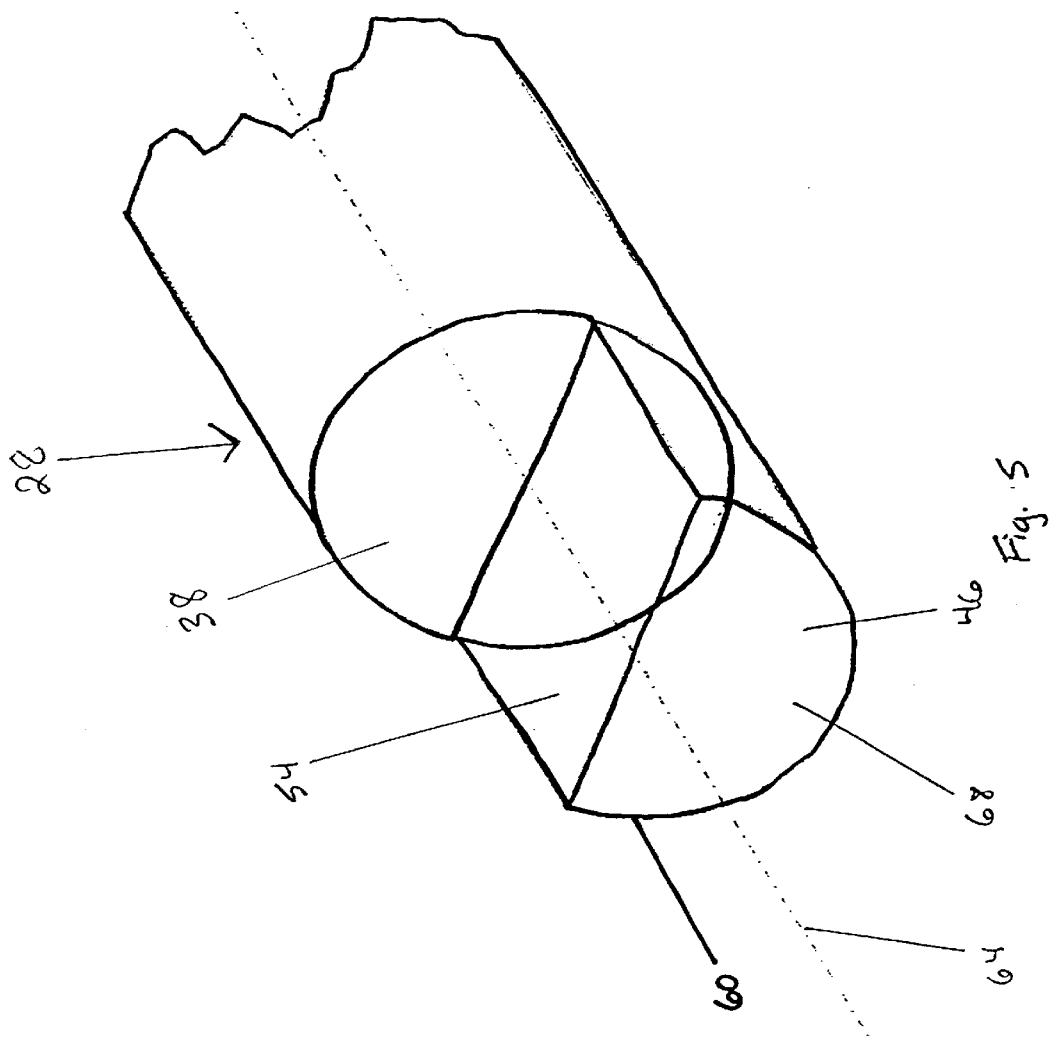

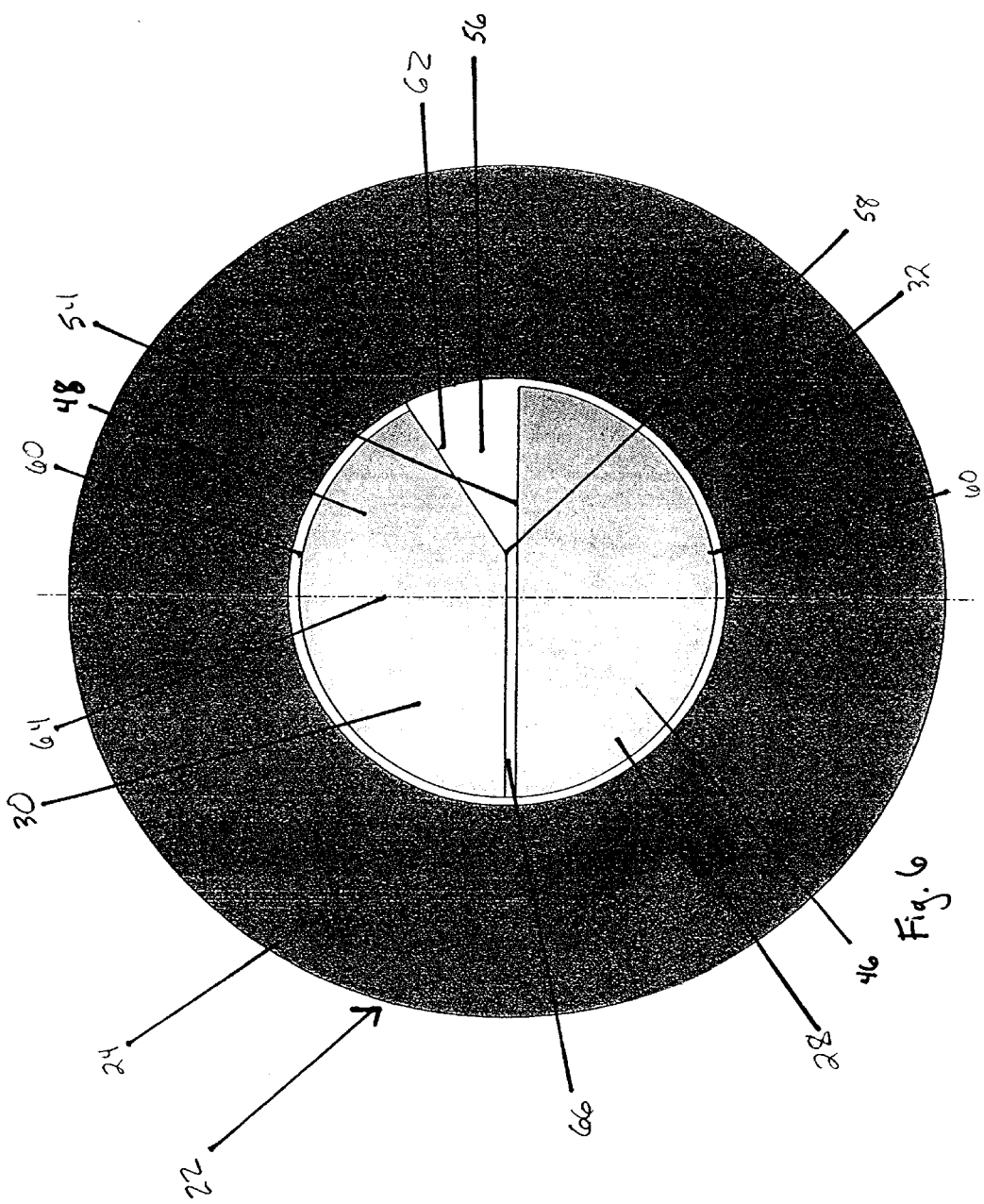

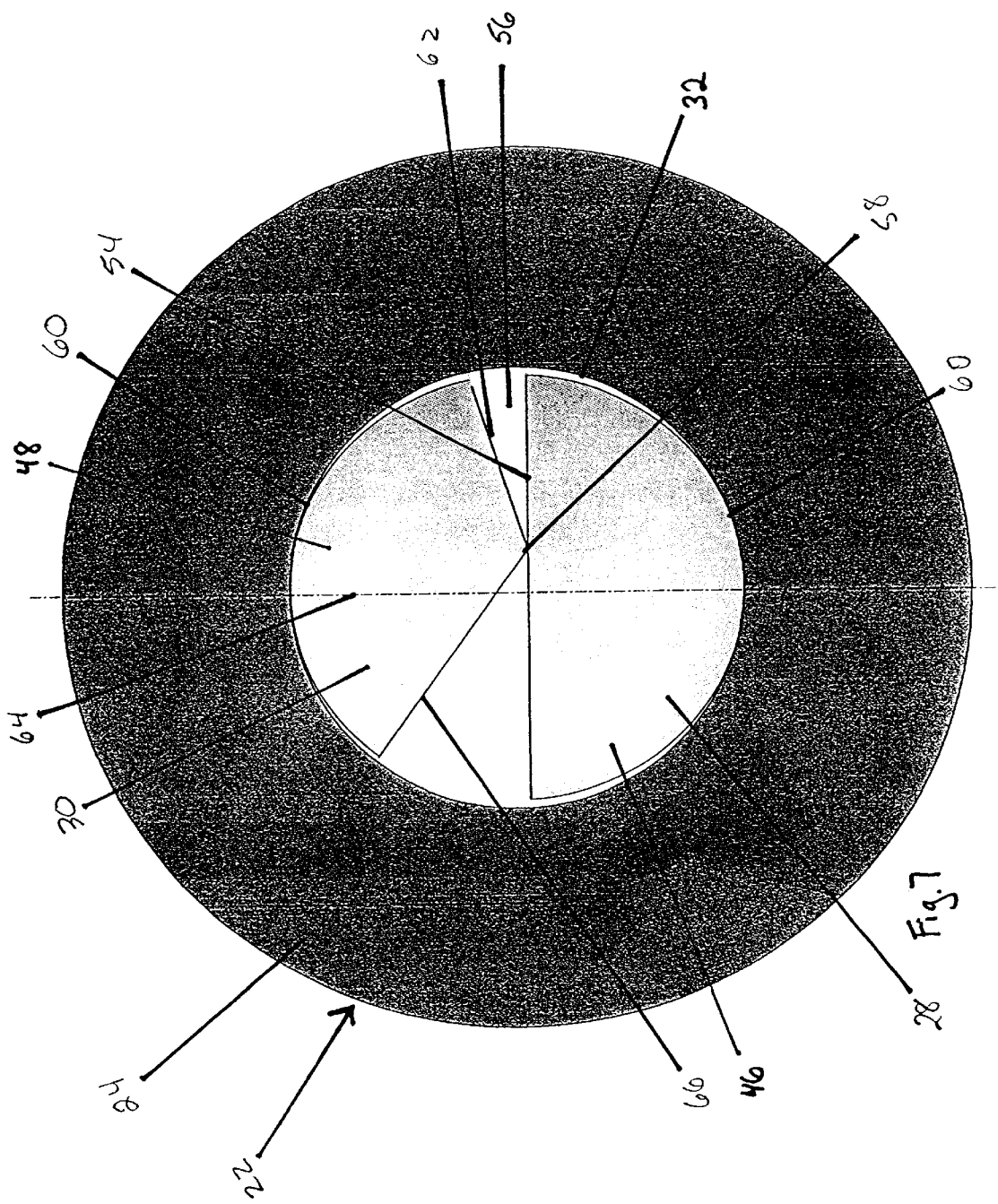

METHOD FOR RELEASABLY LOCKING A STEERING COLUMN

This application is a division of application Ser. No. 09/770,962, filed Jan. 26, 2001, now U.S. Pat. No. 6,540,429, which is hereby incorporated by reference herein.

FIELD OF THE INVENTION

This invention relates generally to the field of gear locking mechanisms. In particular, this invention relates to a gear locking mechanism designed to releasably lock a steering column.

DESCRIPTION OF THE RELATED ART

Today's steering columns are adjustable in order to allow for an operator of any size to comfortably steer a vehicle. A steering column must be easily adjustable yet be lockable so that it does not move unless the operator releases the lock and manually adjusts the position of the steering column. However, a locking mechanism must also be able to resist the force applied to the steering column in a crash situation, where a force many times greater than that required for normal adjustment is spontaneously applied.

Historically, locking mechanisms have utilized either friction methods or mechanical methods to releasably lock the telescoping steering column in place. Both the friction and the mechanical mechanisms may be applied to releasably lock the steering column in both the telescoping direction and the rake, or tilt direction. Friction methods are considered to be more adjustable, allowing for an almost infinite number of positions of the steering column. The column can be telescoped toward or away from the operator in any increment. When the desired position is achieved, the operator engages a locking device that applies friction in a way that resists force applied to the column. To adjust the column, the user releases the friction lock. However, in the event of a crash, the force applied to the column is often greater than the holding capacity of the friction lock and the steering column can move, possibly causing injury to the operator.

The mechanical method of releasably locking the steering column in place is less adjustable, but provides a stronger lock that resists force more effectively than many friction locks. A mechanical lock can typically be locked only in a finite number of positions, and therefore increases the complexity of the design by requiring the design to have numerous regimented positions for the lock to engage. For a mechanism to resist force applied to a column, interference of the moving and stationary surfaces must occur. This is often accomplished utilizing gear teeth in a ratcheting or rack arrangement. However, the teeth must be strong enough to resist the shear force applied during a crash situation when the steering column moves against the teeth. While such teeth may exhibit sufficient strength to withstand most crash situations, it is still preferred to have a stronger locking structure.

BRIEF SUMMARY OF THE INVENTION

The present invention satisfies the need for a stronger friction locking mechanism while maintaining an easily manufactured design and a wide range of adjustment positions. In one embodiment of the present invention, a steering column locking mechanism is provided comprising a stationary tube with a movable tube telescopically positioned over it. A plurality of teeth is provided on the outer surface of the movable tube that mesh with teeth defined on the outer diameter of a ring-shaped gear. The ring-shaped gear has an axial opening defined therein and first and second camming pins capable of being arranged in both an unlocked and a locked position are placed within the opening of the gear.

In another embodiment of the present invention, a locking mechanism is provided comprising a ring-shaped gear with teeth on its outer diameter and a second set of teeth for the teeth on the ring-shaped gear to intermesh. First and second camming pins are provided and mounted within an axial opening in the ring-shaped gear. Further, a reduced cross-sectional extension is provided on an end of the first camming pin and a reduced cross-sectional extension with an angular section removed therefrom is provided on an end of the second camming pin. The camming pins are mounted so that the rotation of one of the camming pins causes the camming pins to move away from the axis of rotation.

In yet another embodiment of the invention, a method for releasably locking a steering column is provided comprising the steps of providing a movable tube with teeth on its outer surface positioned over a fixed tube and providing a gear with teeth that intermesh with the teeth on the movable tube. First and second camming pins are mounted within an axial opening in the gear. The method further comprises the step of allowing for the rotation of the second pin relative to the gear and the first pin to alternatively apply and release pressure to the interior walls of the gear and prevent rotational movement of the gear.

BRIEF DESCRIPTION OF SEVERAL VIEWS OF THE DRAWINGS

FIG. 4 is an enlarged perspective view of the second camming pin of the embodiment of FIG. 1;

FIG. 5 is an enlarged perspective view of the first camming pin of the embodiment of FIG. 1;

FIG. 6 is an enlarged cross-sectional view of the ring-shaped gear of the embodiment shown in FIG. 1 taken along the line 6—6 with the camming pins in an unlocked position; and FIG. 7 is an enlarged cross-sectional view of the ring-shaped gear of the embodiment shown in FIG. 1 taken along the line 6—6 with the camming pins in a locked position.

DETAILED DESCRIPTION OF THE PREFERRED EMBODIMENTS OF THE INVENTION

Figure 1:
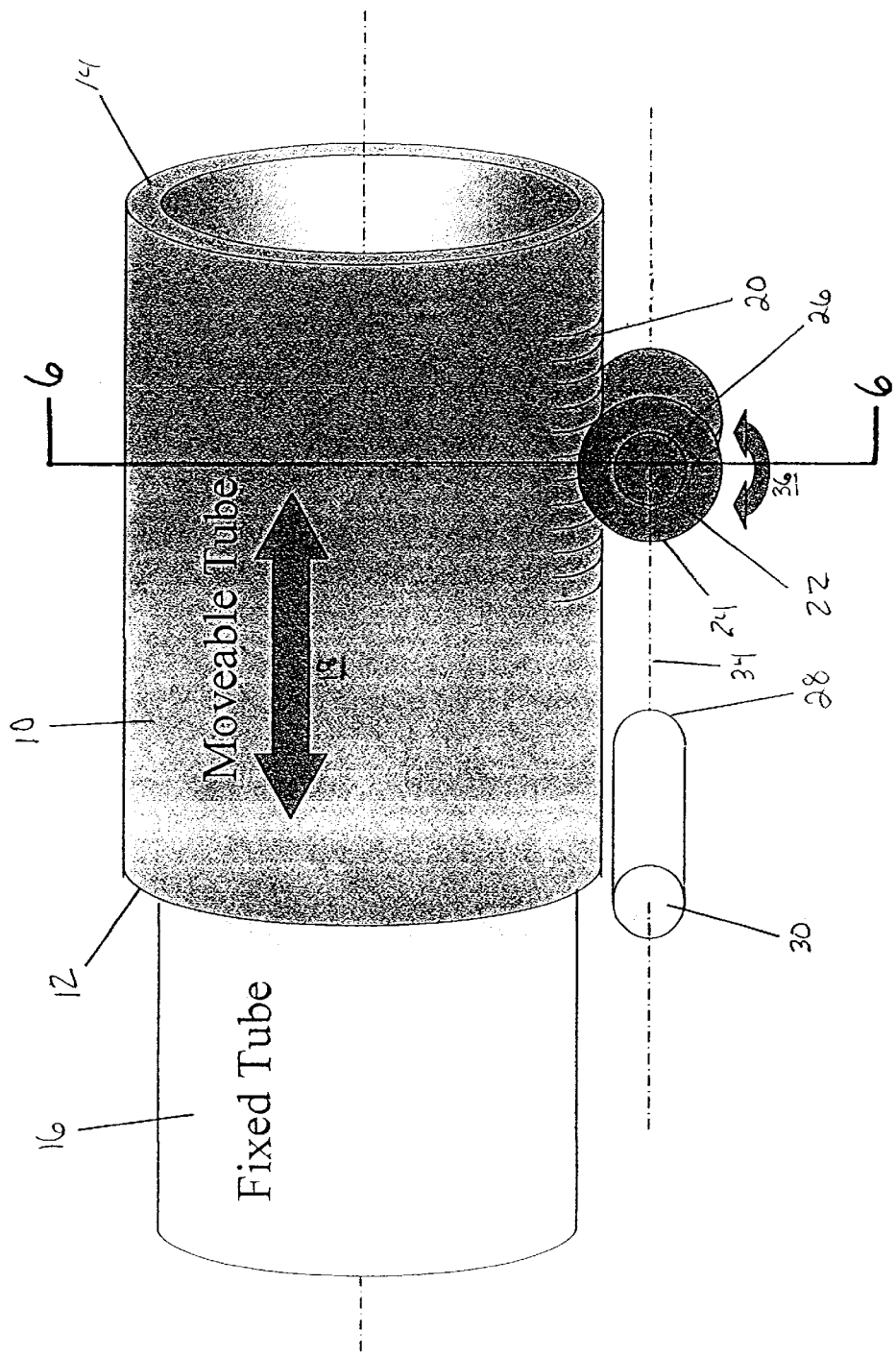
FIG. 1 is a side view of an embodiment of the invention showing the fixed and movable tubes.

A preferred embodiment of the invention is shown in FIGS. 1–7. FIG. 1 shows a perspective view of the entire embodiment. A telescoping arrangement is provided wherein a movable tube 10 with a first end 12 and a second end 14 is telescopically positioned over at least a portion of a stationary or fixed tube 16. The entire steering column is not shown in the Figures, but normally a steering wheel and other common levers are attached at the second end 14 of the movable tube 10. The movable tube 10 has a diameter such that it can freely slide axially on the fixed tube 16 in the directions shown by the arrows 18. The sliding feature of the movable tube 10 allows an operator to axially adjust the position of the steering wheel.

In the preferred embodiment, a plurality of teeth 20 are defined on the outer surface of the movable tube 10. The teeth 20 can be in any position on the outer surface of the movable tube 10. Preferably, a ring-shaped gear 22 is mounted adjacent the movable tube 10 so that its axis of rotation is normal to the extension direction of the steering column. The ring-shaped gear 22 includes a plurality of teeth 24 defined on its outer diameter and is positioned against the movable tube 10 so that the teeth 20 defined on the movable tube 10 and the teeth 24 defined on the ring-shaped gear 22 intermesh. The ring-shaped gear 22 preferably has an axial opening 26 defined therein through which its axis of rotation extends. The axial opening 26 is further defined by interior walls 32 extending around the opening 26.

Figure 2:
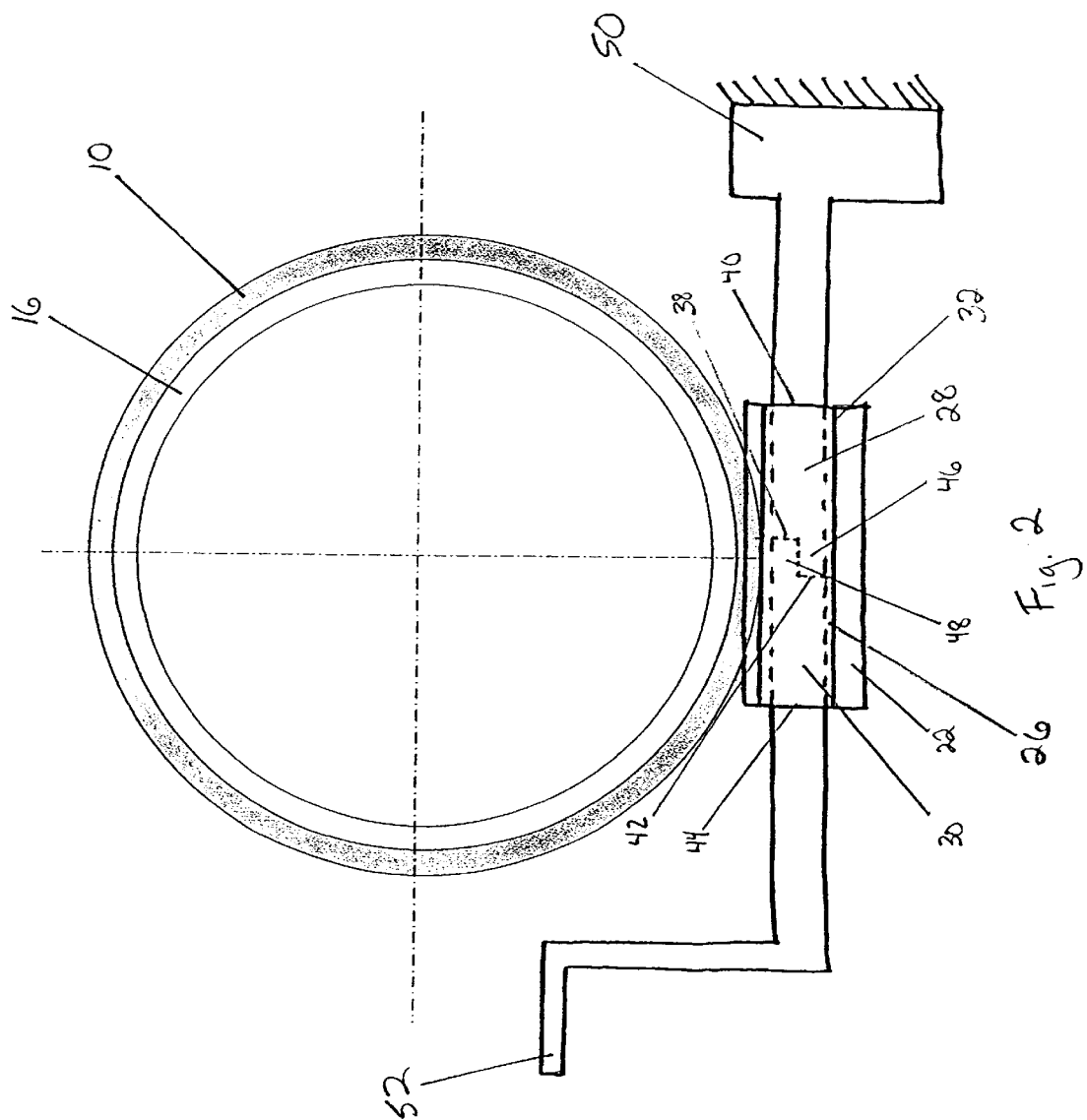
FIG. 2 is a cross-sectional view of the embodiment of FIG. 1.

Referring to FIGS. 1 and 2, two camming pins 28, 30 are preferably positioned in the axial opening 26 of the ring-shaped gear 22 and are not in contact with the interior walls 32 of the ring-shaped gear 22. In FIG. 1, the camming pins 28, 30 are shown unmounted and outside of the axial opening 26 in the ring-shaped gear 22 for clarity. FIG. 2 shows the camming pins 28, 30 positioned in the axial opening 26 of the ring-shaped gear 22. The camming pins 28, 30 are preferably inserted into the axial opening 26 of the ring-shaped gear 22 along a line 34 on the axis of rotation. The ring-shaped gear 22 can rotate freely around the axis when the camming pins 28, 30 are in their unlocked position. An arrow 36 shows the direction of rotation of the ring-shaped gear 22.

FIG. 2 shows a cross-sectional view of a preferred embodiment of the invention. The first 28 and second 30 camming pins are shown positioned in the axial opening 26 of the ring-shaped gear 22. The ring-shaped gear 22 preferably has teeth 24 defined on its outer surface matching the teeth 20 defined on the movable tube 10. The fixed tube 16 is shown positioned concentrically within the inner diameter of the movable tube 10.

Figure 3:
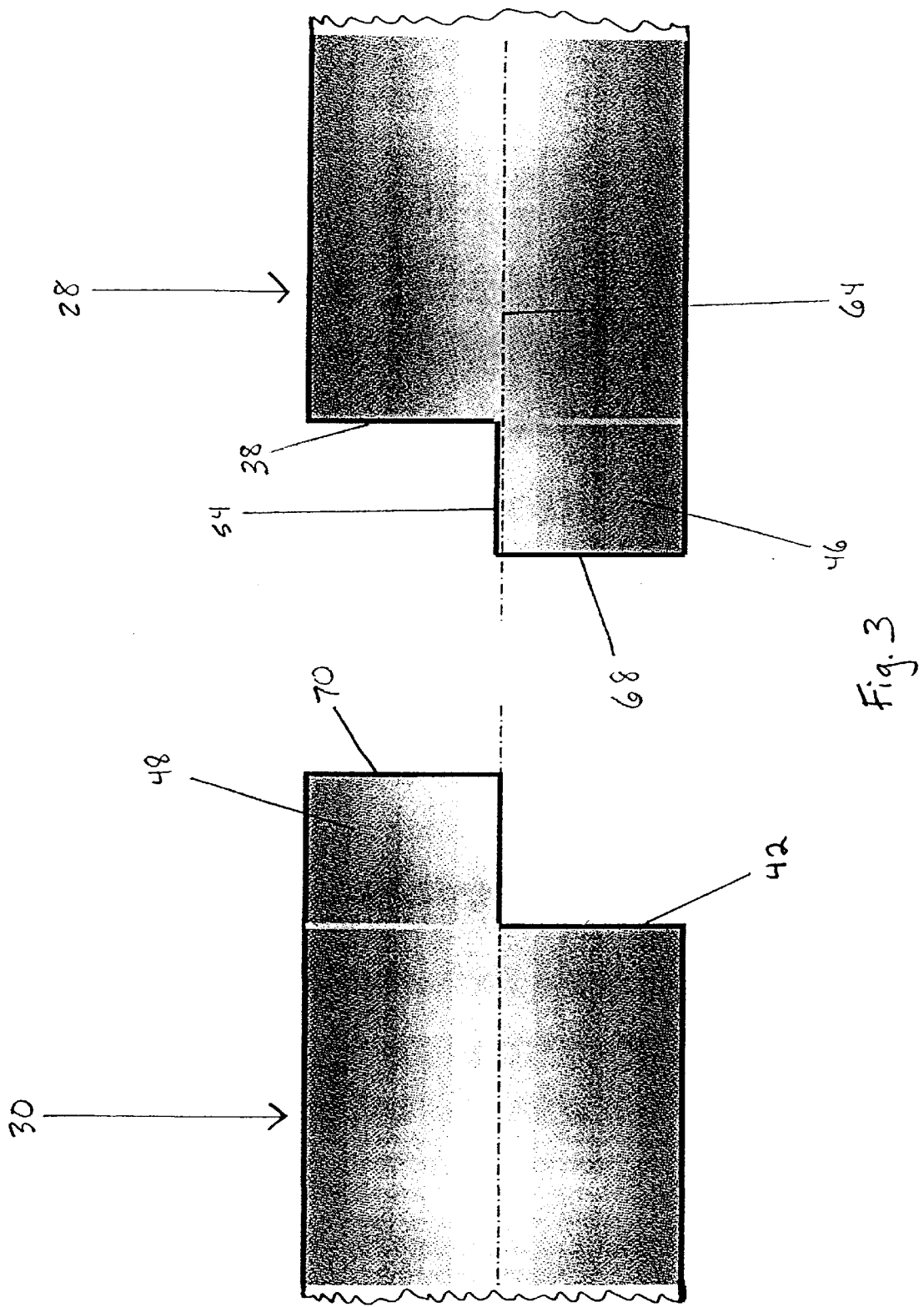
FIG. 3 is an enlarged view of the camming pins of the embodiment of FIG. 1.

FIG. 3 shows an enlarged view of the first 28 and second 30 camming pins in their unassembled state outside of the ring-shaped gear 22. Each camming pin 28, 30 has a first end 38, 42, a second end 40, 44 and a reduced cross-sectional portion 46, 48 extending from their first ends 38, 42. The reduced cross-sectional portions 46, 48 are preferably semicircular in cross-section and are shown in FIGS. 4 and 5. The semicircular portions 46, 48 of the first 28 and second 30 camming pins extend toward each other.

FIG. 3 shows an embodiment of the invention in its fully assembled form, wherein the first camming pin 28 is attached to a mount 50 at the second end 40 of the first camming pin 28. The mount 50 is immovable, and the first camming pin 28 is preferably welded or otherwise attached to the mount 50 such that it is fixed relative to the ring-shaped gear 22 and does not rotate. However, the mount 50 allows some radial movement of the first camming pin 28. The second end 44 of the second camming pin 30 is preferably attached to a lever 52 that an operator can move to rotate the second camming pin 30 between its first and second positions. The lever 52 also allows slight radial movement of the second camming pin 30 toward and away from the flat surface 54 of the first camming pin 28. The first position is the unlocked position and the second position is the locked position.

Referring in conjunction to FIGS. 2, 4 and 5, FIG. 4 shows an enlarged perspective view of a preferred embodiment of the second camming pin 30. A semicircular portion 48 extends from the first end 42 of the second camming pin 30. The semicircular portion 48 has an angular section removed therefrom. The angular section is formed by cutting a wedge shape 56 from a point 58 to the outer diameter 60 of the semicircular portion 48 of the second camming pin 30. The angular cut forms a first flat section 62. Preferably, the point 58 where the cut begins is outside of the center axis 64 of the camming pins 28, 30. The uncut section of the semicircular portion 48 forms a second flat section 66.

FIG. 5 shows an enlarged perspective view of a preferred embodiment of the first camming pin 28. The first camming pin 28 has a semicircular portion 46 extending from its first end 38. The semicircular portion 46 of the first camming pin 28 preferably has a flat surface 54 at the interface between the first camming pin 28 and the second camming pin 30. This flat surface 54 is the primary contact surface between the first 28 and the second 30 camming pins. The first 28 and second 30 camming pins also contact each other at the end faces 68, 70 and the first ends 38, 42 of the first 28 and second 30 camming pins.

FIG. 6 shows a cutaway side view taken along the line 6—6 of FIG. 1 showing the interrelationship between the camming pins 28, 30 and the ring-shaped gear 22 in a preferred embodiment of the invention. The ring-shaped gear 22 is shown in cross-section looking through the axial opening 26. The semicircular extensions 46, 48 of the first 28 and second 30 camming pins are in place in the axial opening 26 in the ring-shaped gear 22. Preferably, the first camming pin 28 is stationary in the position shown in FIGS. 6 and 7. The first camming pin 28 is preferably fixedly secured to the mount 50 shown in FIG. 2 to maintain its stationary position. In the unlocked position as shown, the outer diameters 60 of the first 28 and second 30 camming pins do not touch the interior walls 32 of the ring-shaped gear 22 and pressure is not applied to the ring-shaped gear 22. This allows the ring-shaped gear 22 to rotate axially.

In its unlocked orientation, the second camming pin 30 does not contact the flat surface 54 of the semicircular extension 46 of the first camming pin 28 and a space is present between the surfaces. In this orientation, the camming pins 28, 30 are not in contact with the interior walls 32 of the ring-shaped gear 22. When the second camming pin 30 is in its unlocked position as shown in FIG. 6, the ring-shaped gear 22 can rotate freely about the camming pins 28, 30, allowing the axial adjustment of the movable tube 10 by the operator.

FIG. 7 also shows a cutaway side view taken along the line 6—6 of FIG. 1 showing a preferred embodiment of the invention with the second camming pin 30 in its locked position. The first camming pin 28 does not rotate. The second camming pin 30 is rotated between its locked and unlocked orientations preferably by moving a lever 52 attached to the second end 44 of the second camming pin 30. As the relative travel of the second camming pin 30 to the lever 52 is small, an intermediate link may be placed between the lever 52 and the second camming pin 30. This intermediate link would allow a large movement of the lever 52 to rotate the second camming pin 30 a small distance. When the second camming pin 30 is rotated to its locked position, radial movement is also imposed upon the second camming pin 30, urging the second camming pin 30 away from its original axis of rotation. This skewing of the second camming pin 30 causes a section of the outer diameter 60 of the second camming pin 30 to come in contact with the interior walls 32 of the ring-shaped gear 22, thereby causing a friction lock on the interior walls 32 of the ring-shaped gear 22. The radial movement of the second camming pin 30 also causes the point 58 of the second camming pin 30 to come in contact with the flat surface 54 of the first camming pin 28. Pressure is applied through this point 58 to the first camming pin 28 urging the first camming pin 28 radially toward the interior walls 32 and a friction lock is created between the first camming pin 28 and the interior walls 32 of the ring-shaped gear 22. These friction locks prevent the ring-shaped gear 22 from turning and the locked ring-shaped gear 22 in turn prevents the movable tube 10 from sliding axially on the fixed tube 16.

This preferred embodiment also has the feature of increasing the strength of the friction locks in the event of a crash. During a crash situation, force is typically applied to the movable tube 10 in an axial direction. When the movable tube 10 moves axially, the teeth 20 on the movable tube 10 will cause the ring-shaped gear 22 to rotate. If the second camming pin 30 is in its locked position and applying frictional force to the interior walls 32 of the ring-shaped gear 22 as well as to the flat surface 54 of the first camming pin 28, the ring-shaped gear 22 cannot move. When the movable tube 10 pushes against the teeth 24 of the ring-shaped gear 22, rotational force is transferred to the ring-shaped gear 22. Since the first 28 and second 30 camming pins are locked against the interior walls 32 of the ring-shaped gear 22, this rotational force actually has the effect of increasing the friction between the interior walls 32 of the ring-shaped gear 22 and the camming pins 28, 30. The increased friction tightens the lock and the movable tube 10 maintains a stationary position.

It should be noted that there could be a wide range of changes made to the present invention without departing from its scope. Notably, more than one ring-shaped gear 22 and camming pins 28, 30 combination could be used in the same steering column. To further increase the resistance to axial force in both directions, the orientation of the camming pins 28, 30 could be reversed in one of the two combinations. A lever could be constructed to simultaneously operate both combinations, or a separate lever could operate each one. The lever 52 itself could take a multitude of forms, and the intermediate link between the second camming pin 30 and the lever could be discarded. Additionally, the angle used to cut the second camming pin 30 could vary. The invention has been described in relation to a telescoping steering column, but it could also be applied to lock the steering column in any number of other positions, such as the rake, or tilt positions. Thus, it is intended that the foregoing detailed description be regarded as illustrative rather than limiting and that it be understood that it is the following claims, including all equivalents, which are intended to define the scope of the invention.

What is claimed is:

1. A method for releasably locking a steering column, said method comprising the steps of:
   providing a fixed tube and a movable tube with teeth defined on a portion of its outer surface and placed over at least a portion of said fixed tube;
   providing a gear having teeth meshing with said teeth on said movable tube and having an axial opening defining an interior wall;
   providing first and second camming pins mounted within said axial opening defined in said gear;
   allowing for the rotation of said second camming pin relative to said gear and said first camming pin to alternatively apply and release pressure to the interior wall of said gear to prevent or permit rotational movement of said gear.

2. The method of claim 1, wherein a reduced cross-sectional portion extends from a first end of said first camming pin.

3. The method of claim 2, wherein a reduced cross-sectional portion extends from a first end of said second camming pin.

4. The method of claim 3, wherein said reduced cross-sectional portions of said first and second camming pins are semicircular in shape.

5. The method of claim 4, wherein said camming pins are mounted so that a space is present between the flat surfaces of said semicircular portions of said camming pins.

6. The method of claim 5, wherein said semicircular portion of said second camming pin has a cut out section, said cut out section beginning at a point near the center axis of said semicircular portion and forming a wedge shape.

7. The method of claim 6, wherein said point is outside said center axis of said second camming pin.

8. The method of claim 7, wherein when said second camming pin is in a locked position, said second camming pin contacts said semicircular portion of said first camming pin at said point of said second camming pin.

9. The method of claim 8, wherein when said second camming pin is in an unlocked position, said semicircular portion of said second camming pin does not contact said semicircular portion of said first camming pin.

* * * * *